(12) United States Patent
Baum-Waidner et al.

(10) Patent No.: US 7,941,857 B2
(45) Date of Patent: *May 10, 2011

(54) DATA NETWORK AND METHOD FOR CHECKING NODES OF A DATA NETWORK

(75) Inventors: Birgit Baum-Waidner, Au (CH); Christopher M. Kenyon, Langnau am Albis (CH); Michael P. Waidner, Au (CH)

(73) Assignee: International Business Machines Corporation, Armonk, NY (US)

( * ) Notice: Subject to any disclaimer, the term of this patent is extended or adjusted under 35 U.S.C. 154(b) by 254 days.

This patent is subject to a terminal disclaimer.

(21) Appl. No.: 12/183,912

(22) Filed: Jul. 31, 2008

(65) Prior Publication Data

US 2008/0313736 A1   Dec. 18, 2008

Related U.S. Application Data

(63) Continuation of application No. 10/899,767, filed on Jul. 27, 2004, now Pat. No. 7,412,724.

(30) Foreign Application Priority Data

Jul. 31, 2003   (EP) ..................................... 03405570

(51) Int. Cl.
G06F 11/30   (2006.01)

(52) U.S. Cl. ................................. 726/23; 726/25; 726/3
(58) Field of Classification Search ................ 726/3, 22, 726/23, 25, 27
See application file for complete search history.

(56) References Cited

U.S. PATENT DOCUMENTS

| 6,301,668 | B1 | 10/2001 | Gleichauf et al. |
| 6,952,779 | B1 | 10/2005 | Cohen et al. |
| 7,412,724 | B2 * | 8/2008 | Baum-Waidner et al. ...... 726/23 |

* cited by examiner

Primary Examiner — Edward Zee
(74) Attorney, Agent, or Firm — Scully, Scott, Murphy & Presser, P.C.; Louis J. Percello, Esq.

(57) ABSTRACT

The invention provides a data network, systems and methods for checking nodes of a data network that are used for detecting whether a privacy policy concerning an information is maintained. The information comprises a mark corresponding to the privacy policy. The mark defines the storage place or the accessing paths or the transferring paths of the information. The mark is automatically searchable. The mark is searched, analyzed and checked as to whether the privacy policy is maintained. The advantage of the system is that vulnerabilities of systems for protecting confidential information may be detected a long time before an attack on the confidential information occurs.

7 Claims, 3 Drawing Sheets

DATA NETWORK AND METHOD FOR CHECKING NODES OF A DATA NETWORK

RELATED APPLICATIONS

This application is a continuation application of U.S. application Ser. No. 10/899,767, filed Jul. 27, 2004.

FIELD OF THE INVENTION

The invention relates to a data network and to a method for checking nodes of a data network, and more particularly to a tracing tool providing information on the maintaining of an access or transfer policy in a network. The invention is applicable to software applications and may be used in various kinds of networks for detecting possible paths for transferring or accessing an information or for accessing a node in the network that are not allowed in accordance with a privacy policy.

BACKGROUND OF THE INVENTION

Data networks have become increasingly complex and it is a tremendous task to maintain and to monitor a policy that determines the authorizations for accessing private information. In the state of the art it is well known to use firewalls, for example to limit the access to a private network that is connected to the Internet only to users having the allowance and the key to access the private network. It is known from the article "The design of grids: a graph-based intrusion detection system" by Stephen Chung et al., Department of Computer Science, University of California at Davis, Jan. 26, 1999, to use computer-graphs for detecting an attack from outside to a private network. In that system, unauthorized accesses from outside were detected as graphs and compared to given graphs designed according to a given network policy. If an access from outside results in a graph that does not fit with the given graph, then an attack is detected. Intrusions which are small, slow, or both might not be detected by that system. Hence, it is still possible for intruders to intrude into the system.

The known systems have the disadvantage that a failure in protecting confidential information in a network is detected after the attack. This means that in most cases the confidential information may be transferred to the attacker before the unauthorized access has been detected.

SUMMARY OF THE INVENTION

To overcome the disadvantages, an aspect of the present invention is to provide networks, apparatus and methods for checking a network that helps to detect a vulnerability of a system for protecting information in a network or a node of the network before an unauthorized attack occurs. This aspect of the invention is achieved by a data network comprising: a set of nodes (1-7) connected to each other by a data transmission path; at least one node (4) comprising a storage medium (8); information that is stored in the storage medium (8), the information (17) and/or the node (1-7) comprising an automatically searchable mark (11, 15), the mark (11, 15) corresponding to a privacy policy for storing or accessing or transferring the information (17) or for accessing the node (1-7); and a searching engine (13) for detecting and analyzing the mark (11,15).

Also provided is a method for checking nodes (1-7) of a data network and/or information (17) stored in a node (1-7), wherein the nodes (1-7) are connected with data paths, wherein at least one of the nodes (4) and/or the information (17) comprises an automatically searchable mark (11, 15) corresponding to a privacy policy for storing or accessing or transferring the information (17) or for accessing the node (1-7), the method comprising the steps of: searching for the mark (11,15) and the marked information (17); and analyzing the mark (11, 15) and checking whether the privacy policy of the marked information (17) is maintained.

The data network has an advantage that an unauthorized possible attack is detected independently from an actual access to a confidential information or to a confidential node. For attaining this advantage, a mark is used for an information and/or a node that corresponds to a policy for storing, accessing or transferring the information or for accessing the node. The policy is also referred to as privacy policy or confidentiality policy. In an advantageous embodiment the mark defines possible paths for accessing marked nodes or marked information are detected before an inadmissible attack occurs. In complex networks that may change continuously often the possible paths for accessing confidential information are not known in detail. The invention assists in detecting and in updating the possible paths of a network for accessing confidential information.

The method has the advantage that a failure in protecting confidential information, i.e. private information, in a network is detected prior to an attack. This advantage is attained by using a mark for a node of the network or a mark for an information of the network that corresponds to a privacy policy for storing, accessing or transferring the information or for accessing the node. In an advantageous embodiment the mark defines that the node and/or the information is confidential and the mark defines over which allowed paths the confidential information or the confidential node has to be accessed. The privacy policy is not necessarily stored in the mark itself. The privacy policy might be stored in a database to which the mark refers. The mark of the confidential node or the confidential information is detected and several possible paths to access the node or the confidential information were detected and stored. Therefore, the method checks prior to an attack by which ways a confidential information or a confidential node could be accessed.

BRIEF DESCRIPTION OF THE DRAWINGS

Embodiments of the invention are described in detail below, by way of example only, with reference to the following drawings, in which.

DETAILED DESCRIPTION OF THE INVENTION

Figure 1:
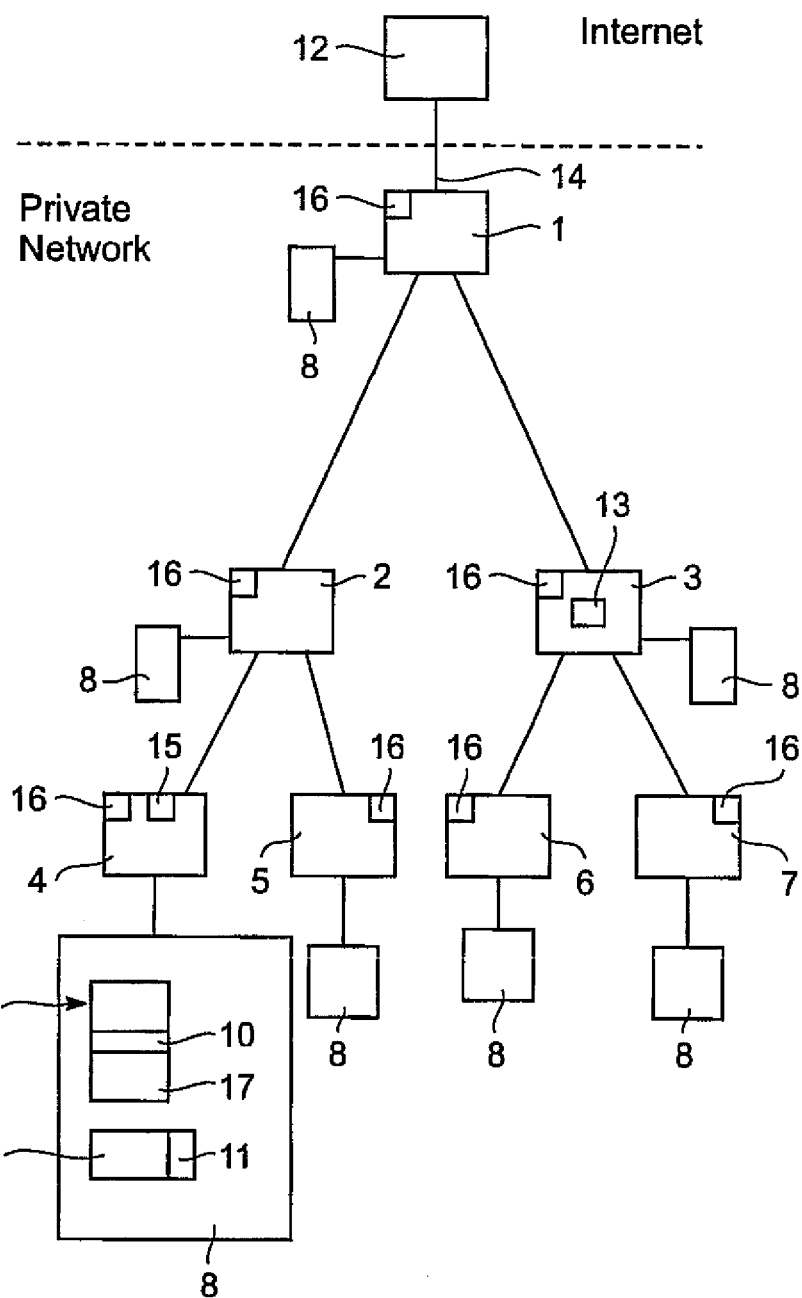
FIG. 1 shows a private network which is connected to the Internet.

The present invention provides network, apparatus and methods for checking a network that helps to detect a vulnerability of a system for protecting information in a network or a node of the network before an unauthorized attack occurs. An example of a data network comprises: a set of nodes (1-7) connected to each other by a data transmission path; at least one node (4) comprising a storage medium (8); information that is stored in the storage medium (8), the information (17) and/or the node (1-7) comprising an automatically searchable mark (11, 15), the mark (11, 15) corresponding to a privacy policy for storing or accessing or transferring the information (17) or for accessing the node (1-7); and a searching engine (13) for detecting and analyzing the mark (11,15).

An example of a method is a method for checking a network. There is herein provided a method for checking nodes (1-7) of a data network and/or information (17) stored in a node (1-7), wherein the nodes (1-7) are connected with data paths, wherein at least one of the nodes (4) and/or the information (17) comprises an automatically searchable mark (11, 15) corresponding to a privacy policy for storing or accessing or transferring the information (17) or for accessing the node (1-7), the method comprising the steps of: searching for the mark (11,15) and the marked information (17); and analyzing the mark (11,15) and checking whether the privacy policy of the marked information (17) is maintained. In some implementations, the method of the present invention is via a computer program product and/or a computer usable storage medium.

The data network has an advantage that an unauthorized possible attack is detected independently from an actual access to a confidential information or to a confidential node. For attaining this advantage, a mark is used for an information and/or a node that corresponds to a policy for storing, accessing or transferring the information or for accessing the node. The policy is also referred to as privacy policy or confidentiality policy. In an advantageous embodiment the mark defines possible paths for accessing marked nodes or marked information are detected before an inadmissible attack occurs. In complex networks that may change continuously often the possible paths for accessing confidential information are not known in detail. The invention assists in detecting and in updating the possible paths of a network for accessing confidential information.

The method according to claim 12 has the advantage that a failure in protecting confidential information, i.e. private information, in a network is detected prior to an attack. This advantage is attained by using a mark for a node of the network or a mark for an information of the network that corresponds to a privacy policy for storing, accessing or transferring the information or for accessing the node. In an advantageous embodiment the mark defines that the node and/or the information is confidential and the mark defines over which allowed paths the confidential information or the confidential node has to be accessed. The privacy policy is not necessarily stored in the mark itself. The privacy policy might be stored in a database to which the mark refers. The mark of the confidential node or the confidential information is detected and several possible paths to access the node or the confidential information were detected and stored. Therefore, the method checks prior to an attack by which ways a confidential information or a confidential node could be accessed.

In a further advantageous embodiment the paths for transferring an information within the network are detected for a given network using an automatically searchable mark that defines over which allowed paths confidential information could be transferred within the network. For confidential information possible transferring paths are detected and stored. Therefore, a vulnerability of protecting confidential information within a network is detected prior to the occurring of an attack exploiting this vulnerability. Possible detected paths are advantageously compared with permissible paths that were determined by the mark of the confidential node or by the mark of the confidential information. By the comparison, it is detected whether the permissible paths are the only ones to access an confidential information or to transfer an confidential information within the network. This procedure provides a simple method for checking whether a predetermined policy for accessing confidential information within a network is observed. In a further advantageous embodiment the mark defines an admissible place or location where the information can be permissibly stored according to the privacy policy. If the information is stored in an inadmissible place, a violation of the privacy policy is detected.

Advantageously, the nodes of the network comprise an information file that can be automatically searched. The information file comprises data about an access to confidential information over a node and/or whether the confidential information was transferred over a node. The information files were read out and analyzed for detecting data paths over which an information could be accessed or transferred within the network. Collecting the data about the accesses to confidential information or a transfer of confidential information about a node at the nodes themselves has the advantage that the data is spread within the network and it is not necessary to provide an extra storage medium for storing the data in a central node. Furthermore, an additional storage might be arranged, which stores data about the accesses while the node itself might only refer to the storage.

In an advantageous embodiment, for the possible data paths for accessing a confidential node or a confidential information or for transferring a confidential information, a graph of paths is used. Using graphs is a simple and well known technique for describing paths within an computer network. Advantageously also the admissible paths that are determined by the mark of the nodes or the mark of the confidential information are also stored as a graph. Using graphs has the advantage that the possible paths and the admissible paths can easily be compared and displayed or drafted in an easily understandable figure.

In a further advantageous embodiment, the transferring of the information within the network is monitored for a given time. This has the advantage that not only a one-time view of the situation is detected but the transferring of the information over a long time could provide much more information on the possible paths along which the confidential information could be transferred within the network. The long time monitoring may point out possible paths that are not detected by a one-time view.

In an advantageous embodiment a log file is stored in the node and the log file comprises the data which confidential information was requested by an access to the node. The log files of the node of a network are analyzed for detecting possible access paths or possible transfer paths for confidential information. Using log files has the advantage that log files are a well known means and could therefore be used for storing or reading out the necessary information with different data protocols.

Advantageously, for different nodes, different information, different users, different machines, different domains or different classes of nodes, different classes of information, different classes of users separate admissible paths or separate admissible graphs of paths are used. Thus, a precise checking of the observing path by means of an access or transfer policy within the network is possible. Using different graphs for classes has the advantage that it is not necessary to generate a separate graph for each kind of user, node, information and so on. Therefore, less information has to be stored and calculated and nevertheless a relatively precise view of the possible paths is detected.

Referring to FIG. 1, a network with nodes that are connected by data paths is shown. The network comprises a private network that is connected by a first node 1 with the Internet 12 via path 14, hereafter also referred to as first path 14. The first node 1 is connected by a data path to a second and a third node 2, 3. The second node 2 is connected by a data path to a fourth and a fifth node 4, 5. The third node 3 is connected by a data path to a sixth and a seventh node 6, 7.

The nodes could be embodied as different computing machines that are interconnected to form a network. These machines, herein designated as nodes, may result into geographically remote locations and communicate using a set of predefined protocols. Protocols such as TCP/IP, client/server architecture and message passing could be used for achieving a distributed computing environment. The computing machines may be embodied as servers, clients, routers, firewalls and/or other computing engines.

Each node is connected to, or even comprises, a storage medium 8 that is explicitly only explained for the fourth node 4. In the storage medium 8, a log file 9 is stored. The log file 9 comprises the data which confidential i.e. private information was accessed over the fourth node 4 by a user and whether or which confidential information was transferred over the node to another node. Therefore any marked information has a specific identifier. In this shown embodiment, in the storage medium 8 of the fourth node 4, a marked information 17 is stored. The marked information 17 comprises a mark 11 that defines that the information 17 is confidential and refers here to an access policy. The access policy determines over which data paths and who is allowed to access the marked information 17.

A simple example would be that a marked information 17 is found on a wrong place, e.g., the marked information 17 is offered by lots of servers on the Internet because it was copied and made public after an attack. The presented tool will recognize the mark and cause an alarm. Any other information on that Internet location, i.e. on which node it is stored, does not matter. The mark in the information is sufficient to cause the alarm. This is an example where only the location of the information (e.g., public servers) matters, not the possible paths to the information, and not the way the information has been transported there. advantageously also the way the information was transferred would be detected by the presented tool from the log files. What matters is that the information has gone from its original location to the Internet, which exceeds the privacy policy saying where the information is allowed to go.

In this example, the log file 9 comprises a first information 10. The first information 10 is the information on which information, for example which data file, was accessed over the fourth node 4 and/or which node was accessed over the fourth node 4 and which node accessed the fourth node. In the log file 9 a second mark 15 can be stored that is assigned to the fourth node 4. The second mark 15 determines the whole fourth node 4 as confidential.

For accessing the data for the log file, each node comprises a log file creating machine 16 that stores any access in the log file as to which marked information, for example which data file was requested by the access, which node was used by accessing, to which node the access was directed for obtaining the requested marked information and who accessed the node. The same data were generated for accesses on marked nodes. In the log file, furthermore the time is stored at which the requests were carried out.

Different types of accesses to information or nodes are to write, to read, to modify, to analyze or to copy the information.

Advantageously, each of the nodes of the private network are structured as the fourth node 4. Depending on the embodiment, there might also be different levels of confidentiality for the stored information and/or for the nodes of the network. Depending on the different levels of confidentiality, different groups of paths or nodes are allowed according to the privacy policy to access the marked information or marked nodes.

If an information is marked as confidential, only a limited group of users, nodes and therefore paths between the nodes are admitted for an access to the information. In a simple embodiment, all nodes and information of the private network are marked as confidential and only the nodes and the users of the private network are allowed to access the confidential information and the confidential node. This means that a node, an engine or a user of the Internet 12 is not allowed to access the confidential information or the confidential node. For attaining this access policy, the first node 1 might be embodied as a firewall and does not allow an access from the Internet 12 to the private network. This is, however, a very strict solution since nobody from the Internet is allowed to access the whole private network.

In another embodiment only the fourth node 4 is marked as confidential. For protecting the confidential information of the fourth node 4, the fourth node 4 is constituted as a firewall that only allows an access to its storage medium 8 if a predetermined security key is used by accessing the fourth node 4. Thus, nodes of the Internet 12 could access other nodes of the private network, but not the fourth node 4. The invention, however, is not focused on the question how to limit an access to a confidential information or a confidential node and therefore the different known tools and methods for preventing an impermissible access are not explained in detail.

The invention addresses the aspect of detecting possible paths which could be used to access a confidential information or a confidential node, and in a further aspect, the detected possible paths are compared with a predetermined policy that determines the paths, the users, the nodes that have the permission to access the confidential information or the confidential node. The comparison may detect possible data paths that are not allowed according to a given access policy. The invention also addresses the aspect of detecting possible paths, direct or indirect ones, showing that and maybe also how confidential information was disseminated, per coincidence, by mis-organization or even by an attack.

Within the private network, at the third node 3 a searching engine 13 is located. The searching engine 13 comprises scanning software to check whether within or outside of the private network and where inside and outside of the private network a marked information is stored or a marked node is arranged. The searching engine 13 uses software tools to check the nodes of the network for detecting marked information or marked nodes. For marking an information or a node, different systems could be used. Each node that comprises confidential information comprises a mark 11 in the log file 9 that is dedicated to the confidential information. Each node that is at all confidential comprises a second mark 15 in the log file 9. The scanning software of the searching engine 13 analyses the log files of the nodes and in this embodiment detects that the fourth node 4 comprises marked information in its storage medium. After detecting confidential information in the fourth node 4, the searching engine 13 explores which user, which engine, which node and by which data paths the marked information of the fourth node 4 could be accessed.

The searching engine 13 might also be located outside of the private network i.e. in the Internet 12 and can be used to search for possible data paths to marked information or marked nodes within the private network or to search for marked information that leaks out of the private network.

The mark 11 and the second mark 15 are designed for automatically searching and therefore, the searching engine 13 is able to locate marked information and/or marked nodes in the private network. Depending on the embodiment, the search engine 13 also checks the Internet 12 for marked information or marked nodes and detects the location of marked information or marked nodes on the Internet 12. Information may be a data file, a data record or a database or any other kind of data that comprises any information.

After the location of the marked information and/or marked nodes, the searching engine 13 checks the log files of the nodes of the network to detect paths, nodes, engines and also software tools that can access the marked information or the marked nodes. Using the data of the log files 9, graphs of possible paths, also named as observed privacy graphs, with nodes can be constructed that describe the part of the network that could be used for accessing the marked information or the marked node, that is, in the present embodiment, located at the fourth node 4.

In another embodiment, the searching engine 13 comprises accessing software that is used by the searching engine 13 to detect the possible paths that could be used for accessing the marked information of the fourth node 4. Using this aggressive strategy, the searching engine 13 uses software tools that try to identify which data and privileges were actually needed to access the marked information of the fourth node 4. The needed data and the needed privileges are stored in the storage medium of the searching engine 13 as an observed privacy graph as far as possible. Most of the aggressive search, in contrast to evaluating log files, may be carried out using software agents that use test accounts which should be organized in the same way as the real ones for the corresponding user classes, and with any configurations of privileges to machines and to data in order to catch all possibilities that exist to access the marked information of the fourth node 4. For detecting the marked information, software agents such as crawlers, or any modifications of them could be used. The more machines or nodes are involved in the search, the more undesired but possible data paths to the marked information or the marked node might be found. In order to facilitate such agents finding marked information the information has to be marked beforehand in such a way that the used method can interpret the mark correctly. Such marks may even contain information on the privacy policy itself, such that the comparison might even be done in the agent in order to decide whether an inadmissible path was detected. By the aggressive strategy advantageously a graph of possible data paths is detected which could be used for accessing the marked information of the fourth node 4.

The searching engine 13 compares the mark of the detected marked information with the privileged rights and data that were used by searching and detecting the marked information, wherein depending on the comparison a possible not allowed path could be detected. The privileged rights may be different accounts or security codes.

In a further embodiment the mark of a marked information defines admissible places at which the marked information 17 is permissibly stored. The admissible places are determined by the privacy policy. If a searching engine analyses a mark of a marked information and detects that the marked information is stored on a place that is not allowed according to the mark, the searching engine detects a violation of the privacy policy. If for example an information comprising a mark defining a private network of a company as an admissible place is detected in a network of another company, then the searching engine detects a violation of the privacy policy for this information. The admissible places could also be determined directories in a computing machine or determined files on a computer storage medium.

Figure 2:
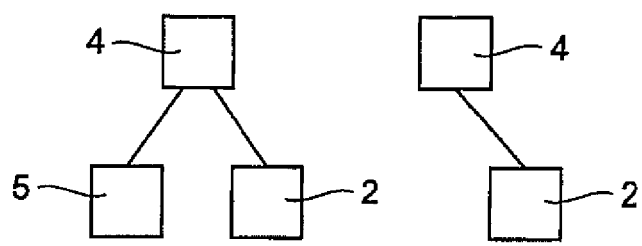
FIG. 2 depicts a detected observed graph and a given policy graph of nodes.

FIG. 2 shows, at the left side, an observed privacy graph of possible paths for accessing marked information that were detected by the searching engine 13. By this embodiment, the marked information of the fourth node 4 can possibly be accessed by the fifth node 5 and the second node 2. At the right side of FIG. 2 an privacy policy graph is depicted that comprises the data paths and nodes that are according the access policy admissible for accessing the marked information of the fourth node 4. The policy graph comprises only the fourth node 4, the second node 2 and the data path in between. The privacy policy graph is constructed according to the privacy policy of the private network. The comparison between the detected observed privacy graph and the privacy policy graph shows that it is possible to access the marked information of the fourth node 4 over the fifth node 5, although the privacy policy graph does not comprise the fifth node. Therefore, this is a path that is not foreseen for accessing the marked information of the fourth node. The searching engine 13 that compares the observed privacy graph with the privacy policy graph causes an alarm in the private network and provides the information maybe by a data file or by displaying on a monitor that the fifth node 5 could be used for accessing the marked information of the fourth node 4, although this is not allowed by the privacy policy. In general, alarms might be forwarded instantly or summarized to one central or several different instances and shown there, or might be made visible on any other ways.

In another embodiment of the invention, the searching engine 13 does not check the possibility of accesses to the marked information for constructing paths by which the marked information could be accessed, but the searching engine 13 checks or monitors the paths that were used for transferring the marked information in the network. advantageously, this is done in predetermined time intervals. For detecting the transfer paths that were used for transferring marked information, for example the log files of the nodes could be checked or software tools could be used for detecting the location of the marked information and construct a transfer path for the marked information. Also, the paths for transferring the confidential information within the network may be compared with the privacy policy that determines the admissible paths over which the marked information can permissibly be transferred. For the transferring paths, the searching engine 13 advantageously constructs observed privacy graphs as shown in FIG. 2 and compares the observed privacy graph of the transfer paths with the privacy policy graph of the transfer paths that is determined by the privacy policy of the private network. An alarm can be produced whenever the policy is violated, based on well-defined marks.

Additionally or alternatively, effective transfer paths for transferring marked information can be identified if searching engine 13 finds marked information (e.g., on an undesired location) and if some original (e.g., allowed) location is known. An effective transfer path might therefore just consist of two nodes, e.g., the private network itself and the undesired destination. As above, such an effective transfer path can be compared with the privacy policy that determines the admissible paths, and the tool can cause an alarm if the effective transfer path exceeds those.

Figure 3:
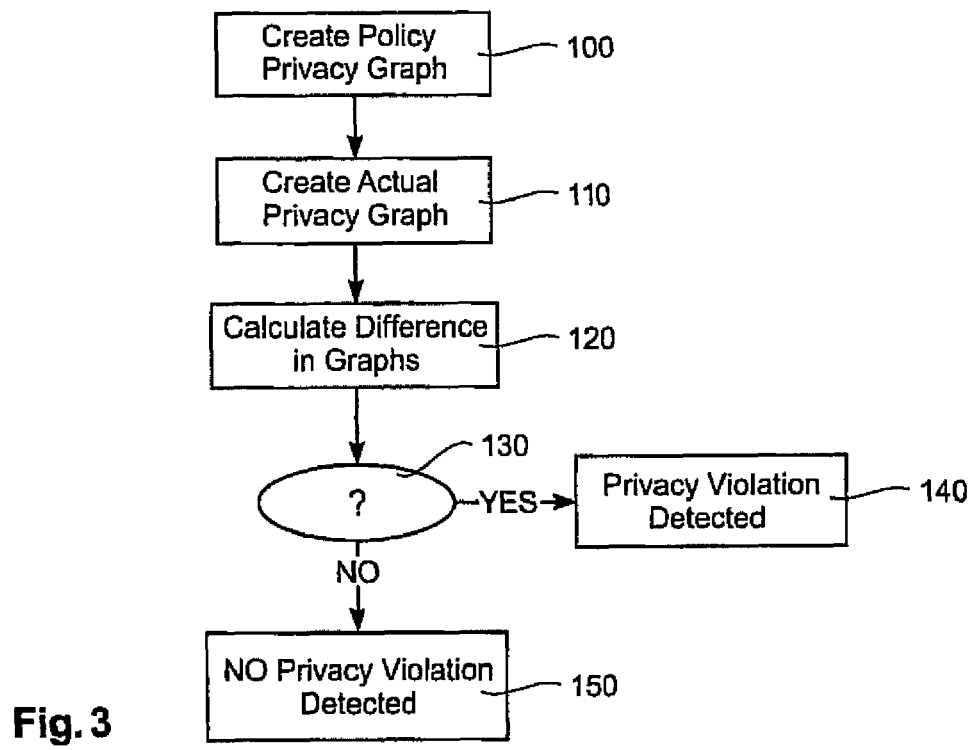
FIG. 3 shows a flowchart of an advantageous method for privacy violation detection.

FIG. 3 shows a flowchart of an advantageous method for checking whether a privacy violation is possible. At a first step 100 a privacy policy graph with nodes and paths is created according to a given privacy policy. This means that at first the nodes and the paths were determined which are admissible for accessing a marked information in the fourth node 4. For example, the privacy policy may determine that every node, every engine and every software tool could be used within the private network to access the marked information of the fourth node 4, however, no access is allowed from the Internet 12. According to this privacy policy, the whole graph of the private network of FIG. 1 constitutes the policy graph. The policy graph is stored in the storage medium 8 of the searching engine 13.

At the following step 110, the searching engine 13 checks according to the above-explained methods and tools the possible data paths for accessing the marked information of the fourth node 4. In the embodiment and with reference to FIG. 1, there is only one path that is not allowed to access the marked information of the fourth node 4, and that is the first path 14 between the first node 1 and the Internet 12. Therefore, the searching engine 13 will at least check the first path 14 and the Internet 12 whether the first path 14 could be used for accessing the marked information of the fourth node 4. In the case of another structure of the private network, the searching engine 13 will basically search the paths and the nodes for detecting possible paths and nodes for accessing the marked information of the fourth node 4. The detected possible data paths and nodes constitute an actual or observed privacy graph. The observed privacy graph is designed according to the result of the checking process of the searching engine 13. If it is possible to access the marked information of the fourth node 4 by the first path 14 and the Internet 12, then the detected observed privacy graph contains the whole private network and additionally the first path 14 and the Internet 12.

At the following third step 120, the searching engine 13 determines the difference between the privacy policy graph of the first step 100 and the observed privacy graph of the second step 110. In the ideal case, the observed privacy graph is the actual privacy graph. At the following fourth step 130, the question arises whether the observed privacy graph exceeds the privacy policy graph. The comparison at the third step in the shown embodiment leads to the result that the observed privacy graph exceeds the privacy policy graph. The term exceed means that the observed privacy graph has at least one path and/or node that is not part of the privacy policy graph. If, as in the example, the observed privacy graph exceeds the privacy policy graph, at a following fifth step 140 a vulnerability is detected. If the searching engine 13 detects a vulnerability, an alarm message is caused that might be sent as a file or displayed on a monitor. If the question at the fourth step 130 comes to the result that the observed privacy graph does not exceed the privacy policy graph, then the searching engine 13 detects no vulnerability at a sixth step 150.

Figure 4:
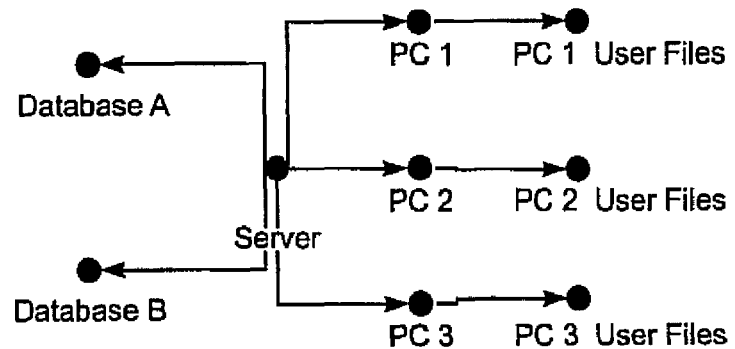
FIG. 4 shows a detected observed graph of nodes.
Figure 5:
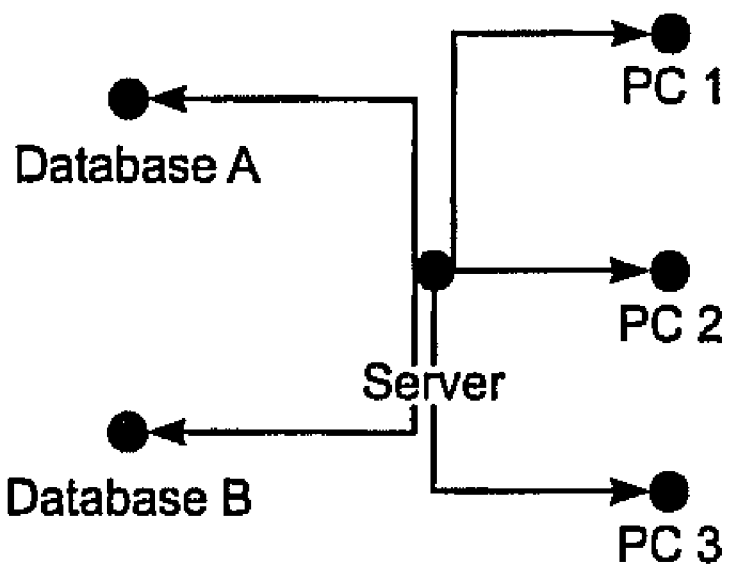
FIG. 5 shows an example graph of a privacy policy.

FIG. 4 shows an example for an observed privacy graph that was detected by the searching engine 13. In FIG. 5, the privacy policy graph determined by the mark of the confidential information that is stored in user files on the first, second and third personal computer PC1, PC2, PC3 is shown. The desired access policy is that a user with a super-user privilege on the server can access the first, the second and the third personal computer PC1, PC2 and PC3, e.g. for software application issues, but is not allowed to access user files on the personal computers. The graph shown in FIG. 4 ends at the confidential information.

Figure 6:
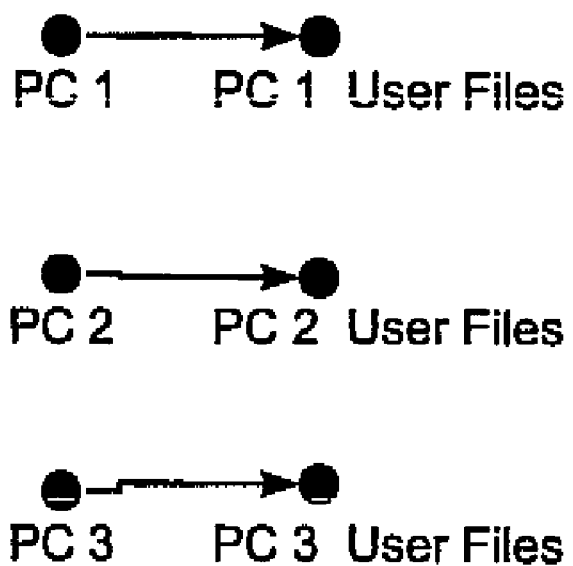
FIG. 6 shows an unauthorized detected part of an observed graph of FIG. 4.

FIG. 6 shows, for the embodiment of FIG. 4 and FIG. 5, the extension of the observed privacy graph in comparison to the privacy policy graph. Therefore, the searching engine has detected that a violation of the privacy policy is possible. FIG. 6 was created by differencing the graph of FIG. 4 and FIG. 5.

The privacy policy graph does not necessarily exist for every machine or node. It should exist for all privacy-related information, wherever it might be created, transferred or stored. The privacy policy graph should also exist for users or machines or complete domains, etc. determining which information or nodes they are allowed to access. In addition to actual machines, the nodes of the privacy policy graphs might also/rather describe logical classes of nodes, for example related to role or functionality with respect to the confidential information.

Privacy policy graphs may exist per information or per classes of information (e.g. defined by the end node representing confidential information), but might also occur as one per class of user or per user (e.g. showing the ways the user can obtain any confidential information).

The structure of the privacy policy graph and the structure of the observed privacy graph depend on the way the invention is used. It might be of advantage to include all graphs into one graph and even graphs of the type that show the admissible transferring paths and the admissible accessing paths together in one graph. In this manner, it might be seen more clearly how marked information can be accessed which has not reached its destination. This result can be used to merely support the users to improve their policy and always help to search for the information.

Advantageously, the information is marked for example with regard to the time the confidential information is created. The marking can be done at creation time or also later. The mark will indicate that the information that we are looking for is confidential. The corresponding information is attributed in the model e.g. as being confidential or e.g. in the privacy policy graph. advantageously, at a first step, for instance the searching engine 13 might only look for information used in a certain organization, e.g. in a bank. However, in another embodiment, the searching engine 13 might have a tool for looking for any marked information on the Internet, or more precisely, information being accessible from the Internet, including information on the Internet, e.g., being public for everybody. This tool might be used, at the same time for efficiency reasons, e.g., by IBM Global Services, on behalf of one or more customers wanting to protect their confidential information.

A further aspect of the invention is to detect confidential or privacy vulnerabilities a long time before confidential data or information are revealed to attackers or anybody else. The approach is intended as being preventive. The detected observed privacy graphs are not caused by users/attackers, but basically by the search engine that will intentionally search for the possibility of attacks, hopefully a long time before any attackers stumble across confidential information. The primary aim is not to observe attacks, but to identify the vulnerabilities and to see where attacks may happen and why. The privacy policy in this system is not necessarily and exclusively defined as being related to the location within the network, but primarily related to the kind of information to be protected. For instance, health data records of a particular patient, wherever they are stored or transferred, should only be accessible to precisely those people who are involved in the treatment and who need to access it. This might include a role-based definition of the policy, including separating areas, etc.

Advantageously, using the aggressive search method it is possible to detect unknown connections if one might find marked information at a node which might not officially been connected with the source node of the marked information. However, this is connected with the search engine. On the other hand, the search engine searches for any marked information without caring about where it might come from. The presented method might reveal an unofficial connection—but even without identifying this connection, for example over which ways the marked information went from the source to the node at which it was found, it turns out that there must be a leak somewhere. For example the search engine might investigate a hospital and find marked information of a company there unexpectedly. There might be no known connection from the company as the source node to the hospital as the end node. However, some nodes in the hospital are, surprisingly, connected to the laptop of an employee of the company staying in the hospital as a patient. If the search is done during the laptop is connected to a node of the hospital, then marked information could also be found on the laptop, even if it does not belong to the official network of the hospital. Therefore, a transfer of marked information from the nodes of the hospital to the laptop could be detected by the search engine.

In a further embodiment, the mark that is used for marking the information or a node may refer to very complex policy information that is stored by the search engine. Such information may include complex conditions and refer itself to other information, e.g. with time-dependable conditions. Therefore, it seem not to be useful to maintain the whole policy information in the mark itself, but use the mark as an address that points to a database in which the complex policy information is stored.

The present invention can be realized in hardware, software, or a combination of hardware and software. It may be implemented as a method having steps to implement one or more functions of the invention, and/or it may be implemented as an apparatus having components and/or means to implement one or more steps of a method of the invention described above and/or known to those skilled in the art. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing one or more functions described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent aspects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A system for checking nodes or information stored at nodes of a data network, said system comprising:
   a set of nodes connected to each other by a data transmission path, at least one node comprising a storage medium and a processor device operatively coupled to said storage medium and configured to perform a method comprising:
      storing an automatically searchable mark in said storage medium of said at least one node and associated with one or both of: the at least one node and information stored therein; the automatically searchable mark corresponding to a privacy policy for controlling storage of, transfer of, or access to the marked information or controlling access to the marked node; said automatically searchable mark further defining one or more of: a permissible storage place where the marked information is permissibly stored, a permissible data transmission path for accessing the marked information or the marked node, or a permissible data transmission path for transferring the marked information; said automatically searchable mark enabling a prior determination where in said data network a data may reside;
   a searching engine including a further processor device operatively coupled to said data network and configured to perform a method comprising:
      traversing said data network to detect and analyze the automatically searchable mark stored at said marked node in said data network, said further processor device detecting a place on which the marked information is stored and detecting one or more possible data transmission paths within said data network for accessing the marked information or the marked node or a possible data transmission path or data transmission paths for transferring the marked information in said data network, and
      comparing the detected storage place of the marked information with the permissible storage place that is defined by the automatically searchable mark of the marked information and checking whether the privacy policy is maintained, and further comparing the detected possible data transmission paths for transferring the marked information or for accessing the marked information or the marked node with the permissible data transmission paths that are defined by the automatically searchable mark of the marked information or by the automatically searchable mark of the marked node, and determining whether the privacy policy is maintained, and upon determining a privacy policy violation, generating an alarm.

2. The system according to claim 1, wherein the further processor device of said search engine is configured to create an observed graph of the detected possible data transmission paths, wherein in the storage medium a policy graph of permissible data transmission paths is stored, wherein the permissible data transmission paths are the data transmission paths that are allowed for accessing marked information or a marked node or for transferring marked information, wherein the further processor device compares the observed graph with the policy graph for detecting a possible but not permissible data transmission path.

3. The system according to claim 1, wherein the processor device at said at least one node is further configured to store in a log file which marked information or marked node was requested by an access, wherein the further processor device checks the log files of the nodes for detecting the possible data transmission paths for accessing marked information or marked nodes or for transferring marked information.

4. The system according to claim 1, wherein the further processor device is further configured to search for marked information, wherein the further processor device is configured to access marked information in the data network with privileged rights, wherein the searched possible data transmission paths for accessing the marked information were stored, wherein the further processor device compares the automatically searchable mark of the detected marked information with the privileged rights that were used by accessing the marked information, wherein depending on the comparison a possible but not admissible data transmission path could be detected.

5. The system according to claim 1, wherein for at least one of: a user, a machine, an Internet domain, a node, an information a policy graph with allowed data transmission paths, storage place for accessing a marked information, a marked node, for transferring a marked information is provided, and wherein the further processor device is configured to check for the user, the machine, the Internet domain, the node and/or the information, whether the detected possible data transmission paths or storage places exceed the policy graph.

6. The system according to claim 1, wherein for a class of user, a class of nodes, a class of information a policy class graph with allowed paths, storage places for accessing a marked information, a marked node, for transferring marked information is provided, and wherein the further processor is further configured to check for the class of user, the class of nodes, the class of information, whether the detected possible data transmission paths or storage places exceed the policy class graph.

7. A tangible storage medium readable by a processing circuit and storing computer-readable instructions for execution by the processing circuit to perform method steps for checking nodes or information stored at nodes of a data network, said nodes being connected with data transmission paths, said method steps comprising:

providing an automatically searchable mark located on at least one node for association with one or both of: the at least one node and information stored therein; the automatically searchable mark corresponding to a privacy policy for controlling storage of, transfer of, or access to the marked information or, controlling access to the marked node; said automatically searchable mark further defining one or more of: a permissible storage place where the marked information is permissibly stored, a permissible data transmission path for accessing the marked information or the marked node, or a permissible data transmission path in which the marked information could be permissibly transferred; said automatically searchable mark enabling a prior determination where in said data network a data may reside; and traversing, by a search engine, said data network to detect and analyze the automatically searchable mark stored at said marked node in said data network for detecting the places on which the marked information is stored in said data network and detecting possible data transmission paths for accessing the marked information or the marked node or, detecting a possible data transmission path for transferring the marked information in said data network;

comparing, by the search engine, the detected storage place of the marked information with the permissible storage place that is defined by the automatically searchable mark of the marked information and checking whether the privacy policy is maintained, and comparing the detected possible data transmission paths for transferring the marked information or for accessing the marked information or the marked node with the permissible data transmission paths that are defined by the automatically searchable mark of the marked information or by the automatically searchable mark of the marked node, and determining whether the privacy policy is maintained, and generating, by the search engine, an alarm upon determining a privacy policy violation.

* * * * *